US005154667A

United States Patent [19]

Mauch et al.

[11] Patent Number: 5,154,667

[45] Date of Patent: Oct. 13, 1992

[54] POWER HAMMER IMPROVEMENTS

[75] Inventors: Magnus Mauch, Neuhausen; Rudolf R. J. Hennecke, Remshalden-Buoch, both of Fed. Rep. of Germany

[73] Assignee: Gebruder Lindenmeyer GmbH & Co., Fed. Rep. of Germany

[21] Appl. No.: 106,671

[22] Filed: Oct. 9, 1987

Related U.S. Application Data

[63] Continuation of Ser. No. 785,330, Oct. 7, 1985, abandoned.

[51] Int. Cl.[5] .............................................. B23B 45/16

[52] U.S. Cl. ................................... 173/135; 405/232; 44/628; 44/300; 60/39.08; 60/39.5; 60/274; 123/569

[58] Field of Search ............... 173/134, 135, 132, 136, 173/138; 60/39.08, 39.27, 39.5, 274; 123/179 F, 180 AC, 196 A, 196 M, 569; 44/327, 334, 628, 300; 203/10; 208/409; 585/14; 405/232

[56] References Cited

U.S. PATENT DOCUMENTS

| | | | |
|---|---|---|---|
| 2,980,061 | 4/1961 | Brander | 173/132 |
| 4,497,376 | 2/1985 | Kurylko | 173/134 X |
| 4,745,896 | 5/1988 | Schultz | 123/196 M |

*Primary Examiner*—Timothy V. Eley
*Assistant Examiner*—William Fridie, Jr.
*Attorney, Agent, or Firm*—David M. Ostfeld

[57] ABSTRACT

Improvements to diesel power hammers which allow the hammers to be operated smokelessly are disclosed. Kerosene and synthetic oil replace diesel fuel and mineral oil as fuel and lubricant, respectively, in hammers incorporating prior art design improvements by Makers thereof. Other combustibles such as gasoline may be added to the kerosene fuel to improve the quality of combustion and thereby further reduce the emission of smoke.

14 Claims, 2 Drawing Sheets

POWER HAMMER IMPROVEMENTS

This is a continuation of application Ser. No. 785,330, filed Oct. 7, 1985 now abandoned.

TECHNICAL FIELD

The invention relates to power hammers used for pile driving. More specifically, it relates to improvements to certain fuel driven power hammers which permit them to operate smokelessly.

BACKGROUND ART

Power hammers for use in driving piles into the earth have been known for many years and have been manufactured by the assignee of this application and DELMAG Maschinenfabrik Reinhold Dornfeld GmbH+Co. ("Makers") and by other companies for over forty years. The latest fuel driven power hammers manufactured by Makers, which are considered prior art, are D8-22, D16-32, D25-32, D36-32, D46-32, D62-23, D80-23 and D100-13 power hammers. In the past, these hammers have consistently used diesel fuel as a combustible (with ether as a starter fuel) and have emitted some smoke during operation.

Worldwide concern with respect to air pollution has made smokeless operation of fuel driven power hammers advisable. However, no one in the prior art has been able to produce and operate a fuel driven power hammer without producing smoke.

It is the object of the present invention to teach the use of fuel driven power hammers which are smokeless while maintaining substantially the same power delivered by the hammer to the pile.

DISCLOSURE OF THE INVENTION

Changes in the type of fuel (combustible) and lubricant used in power hammers which are manufactured by Makers and which incorporate prior design changes by Makers are discussed. Kerosene replaces diesel fuel as the combustible, and synthetic oil replaces mineral oil as a lubricant. The feed rate is reduced when using kerosene from 100% for diesel fuel to 90% for kerosene and the lube rate is reduced when using synthetic oil from 100% for mineral oil to 20% for synthetic oil. Power hammers thus modified and operated cease emitting smoke for reasons which are not clear at the present time.

BRIEF DESCRIPTION OF THE DRAWINGS

For a further understanding of the nature and objects of the present invention, reference is made to the following drawings in which like parts are given like reference numerals, and wherein.

PREFERRED MODE FOR CARRYING OUT THE INVENTION

Figure 1:
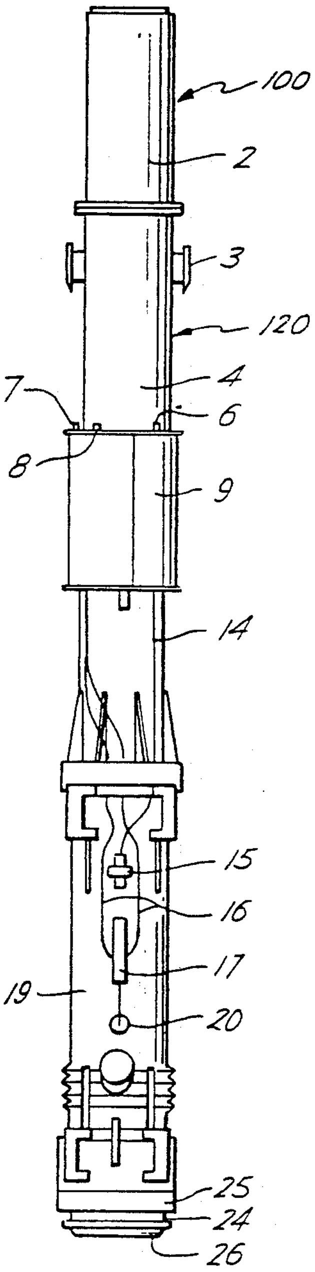
FIG. 1 is front view of a D25-32 power hammer manufactured by Makers.
Figure 2:
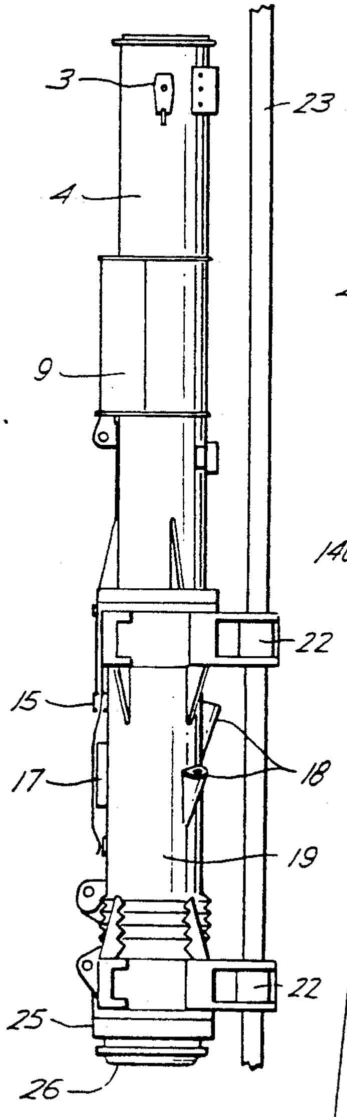
FIG. 2 is a side view of the D25-32 power hammer.
Figure 3:
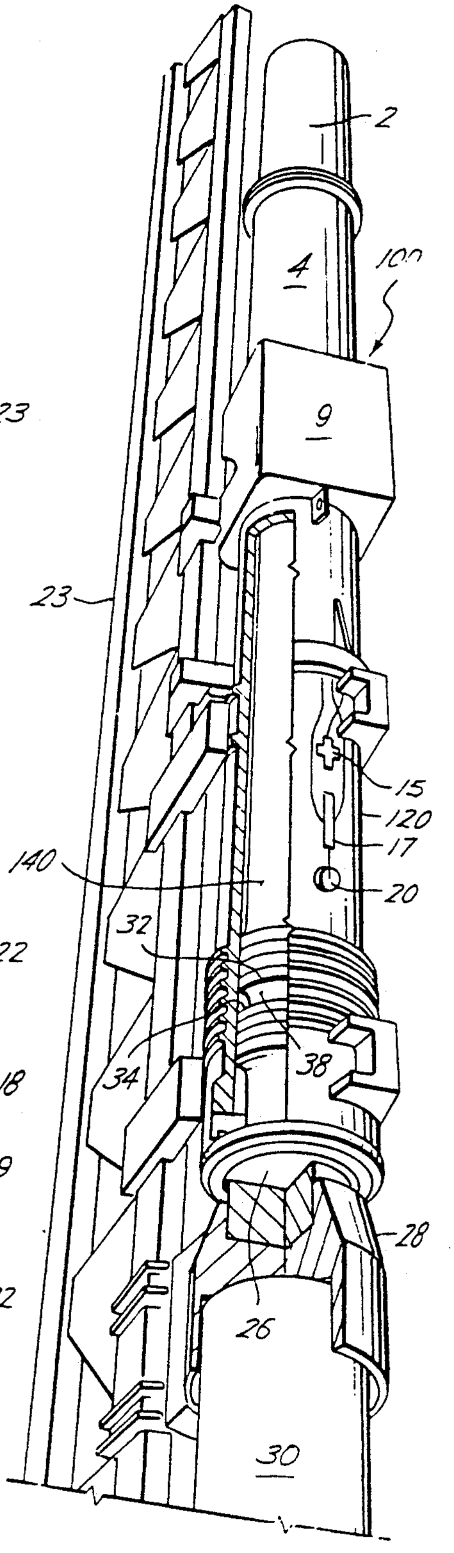
FIG. 3 is a three-dimensional, partial cut-away view of the D25-32 power hammer.
Figure 4A:
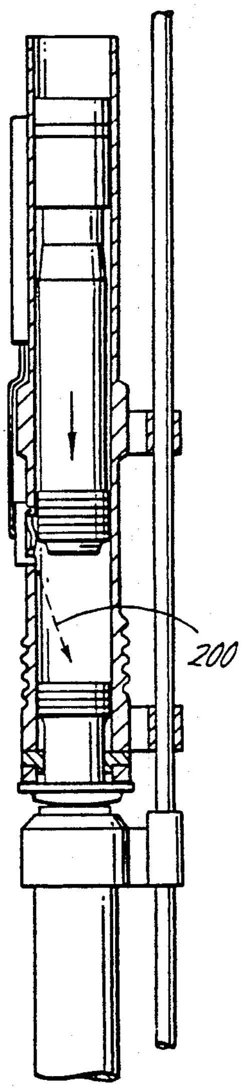
FIGS. 4(*a*)–(*d*) are front partial cut-away views of the D25-32 power hammer in operation.
Figure 4B:
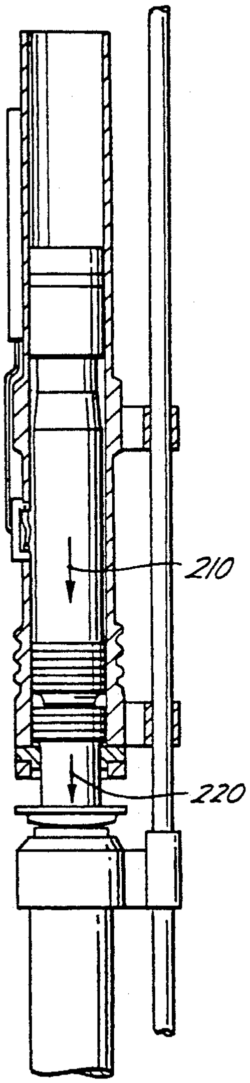
Figure 4C:
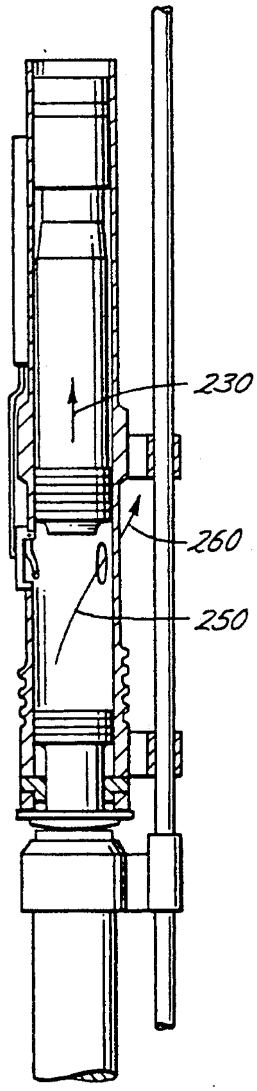
Figure 4D:
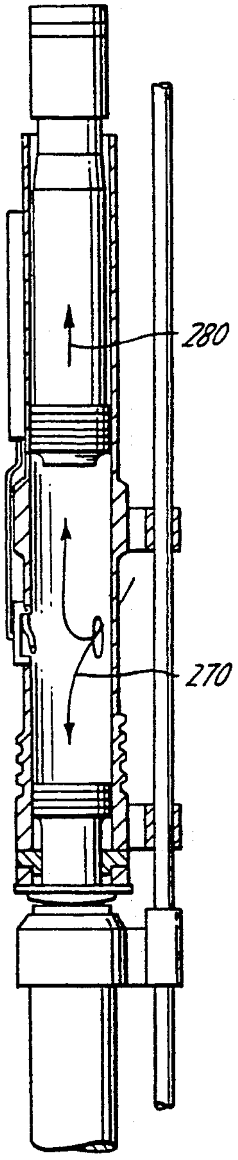

In FIG. 1, there is shown a D25-32 power hammer 100. Hammer 100 includes a cylinder 120 and a piston 140 (FIG. 3). Cylinder 120 includes upper cylinder extension 2 and suspension plates 3 and cylinder upper part 4 and cylinder lower part 19. Fuel/lube/ether tanks 9 are welded on cylinder upper part 4. Tanks 9 include filling hole 6 for lubricant, filling hole 7 for combustible, and filling hole 8 for ether. Lube oil lines 14 extend from tanks 9 to lube oil pump 15. Fuel/breather lines 16 extend from tanks 9 to variable delivery fuel pump 17. A line connects fuel pump 17 with injection valve 20 mounted in cylinder lower part 19. Exhaust port openings 18 are also formed in cylinder lower part 19. Guide clamps 22 are affixed on opposite ends of cylinder lower part 19 to hold it to guide 23 externally adjacent to hammer 100. A two part cylinder endring 25 which is connected by screws to the bottom of cylinder lower part 19, is guiding the impact block 26 and limiting its vertical stroke. The endring 25 and impact block 26 are partially separated by rubber ring 24.

In normal operation, which is old in the art, the piston rides up and down inside the cylinder 120 causing impact at the impact block 26. The impact block 26 transmits the force of impact to the pile helmet 28 and thence to the pile 30 (FIG. 3).

In the prior art, ether is used to start the hammer, which then operates as follows (FIG. 4): the descent of the piston 140 causes the fuel pump 17 to deliver combustible 200 through the injection valve 20 into a combustion chamber 38, the volume of which chamber 38 is decreased by the continuing descent 210 of the piston 140 within the cylinder 120, which raises the pressure in chamber 38 as the volume decreases. This chamber 38 is partially shown in FIG. 3 through the cut-away profile of the cylinder 120 as the space between the bottom surface 32 of the piston 140, the top surface 34 of the impact block 26, and the inside wall of the cylinder lower part 19. The piston 140 also causes the oil pump 15 to deliver lubricant at several points along the cylinder 120 for lubrication. When the piston strikes the impact block (FIG. 4), the falling energy 220 drives the pile 30 downward and simultaneously the fuel is pulverized and ignited, and the resulting explosion force 230 throws the piston 140 upward. The expended gases 250 are exhausted 260 through the exhaust port openings 18 once the piston 140 has ascended past the openings. Fresh air 270 is then drawn into the cylinder 120 through the same exhaust port openings 18 by the suction action 280 of the ascending piston 140, and the cycle begins again. With the above parameters, existing hammers such as the D25-32 power hammer have been found to exhaust smoke in operation. In the prior art, the combustible 200 is diesel fuel and the lubricant is mineral oil.

It has now been experimentally discovered that the use of kerosene, such as Kerosin A-1, instead of diesel fuel, and synthetic oil, such as BelRay MC1, instead of mineral oil, when injected at rates that are approximately ninety percent for kerosene and twenty percent for synthetic oil, preferably, of the rates for diesel fuel and mineral oil respectively, causes prior art hammers manufactured by Makers, such as a D25-32 power hammer, not to emit smoke although producing the same energy as with diesel fuel and mineral oil. It is presently believed, however, that the use of kerosene and synthetic oil would not result in smokeless operation were it not for unique design features incorporated in Makers' most recent model (but prior art) power hammers. In particular, such features are a modified combustion chamber 38 design, a modified fuel pump 17 position, and a modified injection valve 20 position. These features, which are prior art, distinguish Makers' latest model hammers, such as the D25-32 hammer, from older models such as the D25-23, the predecessor of the D25-32. When kerosene and synthetic oil are used with a D25-23 or other hammers not incorporating the above design changes, such hammers exhaust smoke regardless of the rate of injection of fuel and lubricant. This indicates that the above design changes are appropriate to the elimination of exhaust smoke using kerosene and synthetic oil.

Other models of power hammers manufactured by Makers that work smokelessly with kerosene and synthetic oil are the D8-22, D16-32, D30-32, D36-32, D46-32, D62-23, D80-23 and D100-13 power hammers. Accordingly, the description above directed to the D25-32 power hammer 100 should not be construed as limiting. The rate of fuel and lubricant usage by such other hammers will change, as a result of switching to kerosene and synthetic oil, by approximately the same percentage as experienced with respect to the D25-32 power hammer, e.g., down to approximate percentages of the changes of rate of usage of diesel fuel and mineral oil for the D25-32 power hammer.

It has also been shown that the reduction of exhaust smoke can be enhanced by adding gasoline to the kerosene fuel, since the gasoline promotes quicker combustion of the kerosene. By varying the amount of gasoline in the mixture, it is possible to control the point of ignition of the mixture. Therefore, while no particular amounts have yet been derived, the invention here should not be considered as limiting solely to kerosene but may include as much as twenty percent gasoline or other combustibles within the mixture. In addition, the mixing of special combustibles with the kerosene may reduce, to some small extent, the total amount of fuel needed to be injected with each cycle. Other additives such as gasoline, ethanol or methanol can be added to the kerosene to influence the ignition quality. Further, it is possible to inject the fuel at high pressure into the pre-compressed air in the combustion chamber rather than at low pressure as in the present power hammers of Makers.

Normal kerosene and other types of synthetic oil may also be used, but the Kerosin A-1 type and the BelRay MC1 are preferred.

Because many varying and different embodiments may be made within the scope of the inventive concept herein taught, including equivalent structures of materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. In a power hammer apparatus having a cylinder and piston reciprocating in the cylinder, a fuel tank, a lube tank, first means for feeding combustible into the interior of the cylinder below the piston at a combustible rate, second means for feeding lubricant to the cylinder and piston at a lube rate, the improvement comprising:

the combustible is kerosene; and the lubricant is synthetic oil.

2. The improvement of claim 1, wherein:

said kerosene is Kerosin A-1, said synthetic oil is BelRay MC1.

3. The improvement of claim 1, wherein said combustible rate is ninety percent of the rate for diesel fuel.

4. The improvement of claim 1, wherein said lube rate is twenty percent of the rate for mineral oil.

5. The improvement of claim 1, wherein the feeding of combustible occurs at high pressure.

6. The improvement of claim 1, wherein said combustible further includes gasoline.

7. The improvement of claim 6, wherein said gasoline may be up to 20% of the combustible by volume.

8. The improvement of claim 1, wherein there may further be included combustibles of one chemical structure, e.g. pentane (whereas most of the fuels used generally are mixtures of several hydrocarbons).

9. The improvement of claim 1, wherein there may further be included ethanol in the combustible.

10. The improvement of claim 1, wherein there may further be included methanol in the combustible.

11. The improvement of claim 8, wherein there is further included separate direct injection means for separately injecting said combustibles.

12. An internal combustion pile hammer with a fuel injection device mounted into the wall of the cylinder of the hammer which sprays fuel on the impact block of the hammer so that the fuel will be pulverized and ignited due to the impact of the piston of the hammer on the impact block, wherein the improvement comprises the simultaneous use of a quantity of kerosene as fuel and synthetic oil as a lubricant to reduce or eliminate the emission of smoke from the exhaust port openings following combustion.

13. The internal combustion pile hammer of claim 12 wherein the fuel injection device further includes injecting fuel at high pressure.

14. An internal combustion pile hammer of claim 13 and including other combustibles in the kerosene.

* * * * *